(12) United States Patent
Ji et al.

(10) Patent No.: US 12,175,229 B2
(45) Date of Patent: Dec. 24, 2024

(54) KNOWLEDGE BASE FOR PREDICTING SUCCESS OF CLUSTER SCALING

(71) Applicant: Dell Products L.P., Round Rock, TX (US)

(72) Inventors: Jim Lewei Ji, Shanghai (CN); Tianming Zhang, Brighton, MA (US); Edward Guohua Ding, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 462 days.

(21) Appl. No.: 17/545,332

(22) Filed: Dec. 8, 2021

(65) Prior Publication Data
US 2023/0176887 A1   Jun. 8, 2023

(51) Int. Cl.
*G06F 8/65*        (2018.01)
*G06F 9/455*       (2018.01)
*G06F 9/50*        (2006.01)
*G06N 5/00*        (2023.01)

(52) U.S. Cl.
CPC .......... *G06F 8/65* (2013.01); *G06F 9/45558* (2013.01); *G06F 2009/4557* (2013.01); *G06F 2009/45591* (2013.01); *G06F 2009/45595* (2013.01); *G06F 9/505* (2013.01); *G06F 9/5077* (2013.01); *G06N 5/00* (2013.01)

(58) Field of Classification Search
None
See application file for complete search history.

(56) References Cited

U.S. PATENT DOCUMENTS

| | | | | |
|---|---|---|---|---|
| 2011/0276956 | A1* | 11/2011 | Yuki | G06F 8/65 717/170 |
| 2013/0006701 | A1* | 1/2013 | Guven | G06Q 10/0635 705/7.28 |
| 2017/0034023 | A1* | 2/2017 | Nickolov | H04L 43/0817 |
| 2019/0319839 | A1* | 10/2019 | Nozhchev | G06F 8/65 |
| 2023/0072358 | A1* | 3/2023 | Baillargeon | G06F 9/5088 |

* cited by examiner

*Primary Examiner* — Qing Yuan Wu
(74) *Attorney, Agent, or Firm* — Jackson Walker L.L.P.

(57) ABSTRACT

An information handling system may receive a request from a particular remote cluster regarding a cluster scaling event; receive first information from a plurality of other remote clusters indicative of a success or a failure of a corresponding cluster expansion event that was performed at such other remote clusters; receive second information from the plurality of other remote clusters indicative of scores for such other remote clusters in a plurality of metrics; determine, based on the first and second information, a ranking of the metrics based on their criticality to the cluster scaling event; receive third information from the particular remote cluster indicative of scores for the particular remote cluster in the plurality of metrics; and determine a likelihood of success for the cluster scaling event based on the determined ranking of the metrics and the scores for the particular remote cluster in the plurality of metrics.

20 Claims, 2 Drawing Sheets

KNOWLEDGE BASE FOR PREDICTING SUCCESS OF CLUSTER SCALING

TECHNICAL FIELD

The present disclosure relates in general to information handling systems, and more particularly to cluster scaling events in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), it may be desirable to adjust the size of a cluster from time to time. For example, nodes may be added if a workload grows, or nodes may be removed if a workload shrinks or the node is needed elsewhere. In general, these procedures are referred to as cluster scaling. Often, scaling operations may take place while the cluster is still operating, and so there are potential risks involved. For the sake of clarity and exposition, the example of cluster expansion will be discussed in detail herein.

For example, a new node that is to be added to a cluster may include components (e.g., software and/or firmware components) that are not the same version as corresponding components of the target cluster. Typically only certain combinations of component versions are rigorously tested and certified as known-good, and so it is undesirable to add a node that has such differences to a cluster. This risk is also exacerbated by the possibility of a customer downloading software or firmware components manually, instead of applying them through a cluster management system.

Embodiments of this disclosure may reduce such risks by predicting the chances of failure prior to a cluster scaling event.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with cluster scaling may be reduced or eliminated.

In accordance with embodiments of the present disclosure, an information handling system may include at least one processor; and a non-transitory memory coupled to the at least one processor. The information handling system may receive a request from a particular remote cluster regarding a cluster scaling event; receive first information from a plurality of other remote clusters indicative of a success or a failure of a corresponding cluster expansion event that was performed at such other remote clusters; receive second information from the plurality of other remote clusters indicative of scores for such other remote clusters in a plurality of metrics; determine, based on the first and second information, a ranking of the metrics based on their criticality to the cluster scaling event; receive third information from the particular remote cluster indicative of scores for the particular remote cluster in the plurality of metrics; and determine a likelihood of success for the cluster scaling event based on the determined ranking of the metrics and the scores for the particular remote cluster in the plurality of metrics.

In accordance with these and other embodiments of the present disclosure, a method may include receiving a request from a particular remote information handling system cluster regarding a cluster scaling event; receiving first information from a plurality of other remote information handling system clusters indicative of a success or a failure of a corresponding cluster scaling event that was performed at such other remote information handling system clusters; receiving second information from the plurality of other remote information handling system clusters indicative of scores for such other remote information handling system clusters in a plurality of metrics; determining, based on the first and second information, a ranking of the metrics based on their criticality to the cluster scaling event; receiving third information from the particular remote information handling system cluster indicative of scores for the particular remote information handling system cluster in the plurality of metrics; and determining a likelihood of success for the cluster scaling event based on the determined ranking of the metrics and the scores for the particular remote information handling system cluster in the plurality of metrics.

In accordance with these and other embodiments of the present disclosure, an article of manufacture may include a non-transitory, computer-readable medium having computer-executable code thereon that is executable by a processor of an information handling system for: receiving a request from a particular remote information handling system cluster regarding a cluster scaling event; receiving first information from a plurality of other remote information handling system clusters indicative of a success or a failure of a corresponding cluster scaling event that was performed at such other remote information handling system clusters; receiving second information from the plurality of other remote information handling system clusters indicative of scores for such other remote information handling system clusters in a plurality of metrics; determining, based on the first and second information, a ranking of the metrics based on their criticality to the cluster scaling event; receiving third information from the particular remote information handling system cluster indicative of scores for the particular remote information handling system cluster in the plurality of metrics; and determining a likelihood of success for the cluster scaling event based on the determined ranking of the metrics and the scores for the particular remote information handling system cluster in the plurality of metrics.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
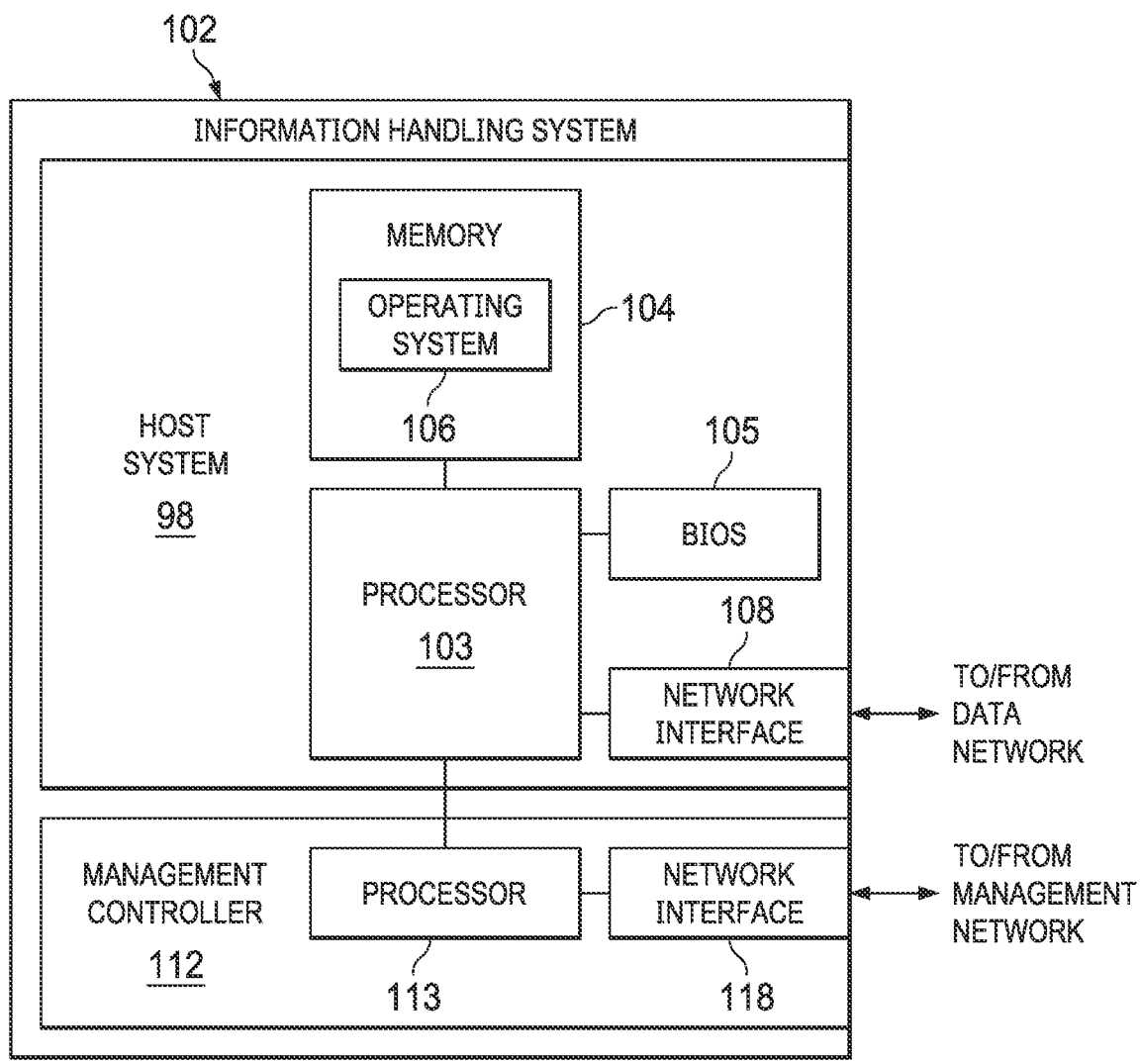
FIG. 1 illustrates a block diagram of an example information handling system, in accordance with embodiments of the present disclosure.
Figure 2:
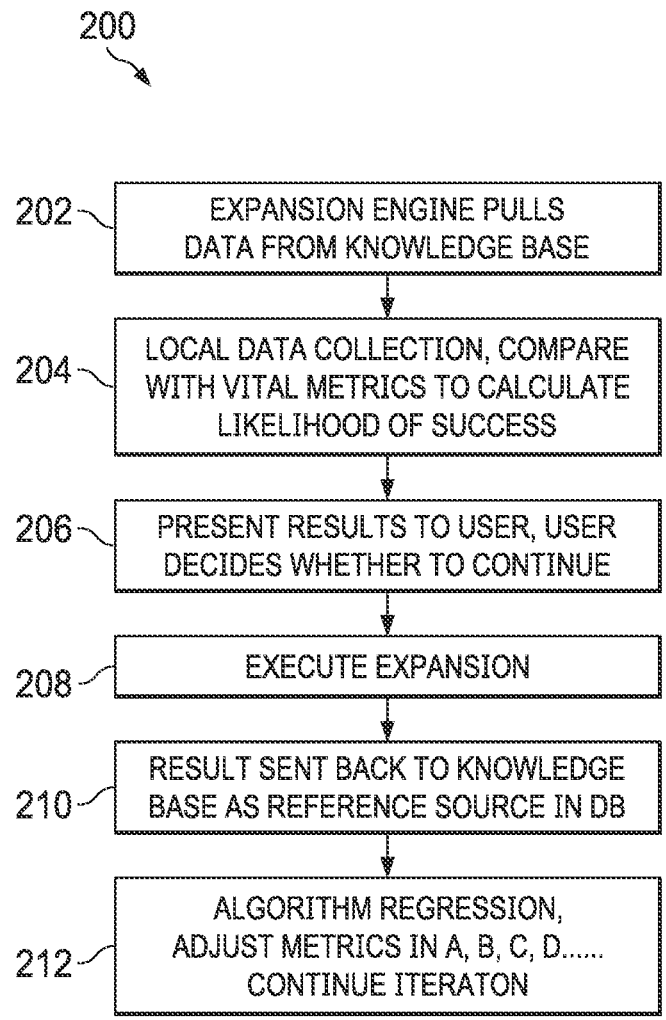
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type. As discussed above, embodiments of this disclosure relate to predicting the success of a cluster scaling event. As one example of a cluster scaling event, an additional information handling system 102 may be added to an existing cluster of information handling systems 102 (e.g., an HCI cluster).

Embodiments may provide such predictions by collecting information relating to previous cluster scaling events in a centralized datacenter known as a knowledge base. In particular, information regarding cluster expansion activity progress, configuration, and results can be persisted to the knowledge base. Customers around the globe can then receive useful predictive information when they are attempting to perform a cluster expansion.

At a high level, one embodiment may proceed as follows.

1. An expansion service executing at the customer datacenter may link to the knowledge base to request reference information. If no reference data is available (e.g., either because no verification has been done for this particular version combination before, or because no customer has yet adopted this new node or build), the default choice is to proceed but with an unknown success rate.

2. If reference data is found at the knowledge base, then this means that the combination in question has been tested and verified by the manufacturer, or some other customer has already tried it.

3. The expansion service may then compare vital metrics between the real environment and the record(s) from the knowledge base. The vital metrics may include information such as hardware model, software versions, firmware versions, etc.

4. The success rate of an expansion activity may be set to 100% initially. If a metric begins to emerge as being correlated with cluster scaling failure, then a deduction based on that metric may be conducted, as applicable to that particular cluster. For example, if metrics of the cluster and the new node exactly match the record in the knowledge base, an assertion of high potential of success (100%) would be made. On the other hand, if some of the metrics match metrics from failed cluster expansion events, then initial 100% number may decline. If the number declines to some threshold low level based on one or more deductions, then an assertion of a high potential of failure would be made. If the likelihood of failure is too high, then some remedial action may be taken in some embodiments (e.g., delaying the cluster scaling event, making a configuration change, upgrading or downgrading a component, etc. prior to attempting the scaling event).

5. The knowledge base may also maintain a map of metrics vs. predicted success rate vs. actual success rate.

Table 1 below provides an example of certain types of metrics that may be considered in some embodiments, as well as example deductions that may be applied to a success rate based on those metrics. For a single cluster scaling operation which has not started yet, a 100% success rate may initially be assigned as a baseline, and deductions may be calculated based on the various metrics that may reduce the predicted success rate to a level below 100%.

Although Table 1 provides one example for a set of possible metrics and corresponding numerical deductions, one of ordinary skill in the art with the benefit of this disclosure will understand that the actual values can be tailored to a given situation based on real-world factors. Further, there may be unknown issues falling outside of the predefined metrics that can cause cluster scaling failures. In that case, the knowledge base may tag such issues and update them going forward in order to provide more accurate guidance.

TABLE 1

| Metric | Relativity | Total Deduction |
|---|---|---|
| A. Cluster system version and system version of new host as a pair match | Usually there are pre-defined and tested pairs in the engineering lab before a new system version is released. If the scaling logic finds no such combination in knowledge base, then mark as high likelihood of failure. Total deduction = (−60%)*(Software stack drift + firmware and driver drift) Software stack drift = Enum{1, 0} * 0.7 Firmware and driver drift = Enum{1, 0} * 0.3 (These numbers assume that software stack drift is more critical than firmware and driver drift, but other assumptions may apply in different embodiments.) | −60% |
| B. Mixed hardware models between cluster and new node | The hardware platform is important to the success rate, and a predefined cluster mixing matrix may be stored for recording results of different combinations of hardware models. Testing and validation procedures may be carried out by the manufacturer to fill in entries in this matrix based on what works well and what does not. If the scaling logic finds that the combination in question is not in the matrix or has not been tested before, then mark as high likelihood of failure. For example, a combination of $4^{th}$ generation hardware with $1^{st}$ generation hardware would have a difference of 3 for purposes of the calculation below. Total deduction = (40%)*(generation difference) Where Generation difference > 3 gives Enum{1, 0}*1 Generation difference = 3 gives Enum{1, 0}*0.7 Generation difference = 2 gives Enum{1, 0}*0.4 Generation difference = 1 gives Enum{1, 0}*0.1 | −40% |
| C. System health | If the cluster and the new node are both in a healthy state, the risk of failure is fairly low. Otherwise, four levels of deduction may be defined based on the severity of any health issues that have been encountered by the cluster and/or the new node: Critical: −30% High: −20% | −30% |

TABLE 1-continued

| Metric | Relativity | Total Deduction |
|---|---|---|
| | Medium: −10% Low: −5% | |
| D. Realtime workload | Workload status also impacts cluster scaling. High workloads tend to drive the need for cluster expansion, but they also affect the success rate. Total deduction = (−10%)*(VM-Num level*0.3 + IOPS*0.7) VM-Num level = {2000, 1500, 1000, 500, less than 500} may map to {1, 0.8, 0.5, 0.3, 0} VM-Num level may be defined relative to the design capacity of a target cluster, configuration, generation, as well as VM type, which is a variable. IOPS may follow a similar model | −10% |

Accordingly, a node expansion engine at the customer datacenter may calculate and measure these metrics and provide to the end user an estimate of how likely this single attempt of expansion is to succeed or fail. The user may then choose whether or not to proceed, or whether some preventative action should be undertaken before proceeding.

If the cluster expansion activity is completed (in either success or failure, meaning that the new node is added or not added to the cluster), then all of the metrics of that instance may be uploaded to the knowledge base as a record to be stored in the database.

Table 2 below provides example records of such a database. For purposes of Table 2, the metrics A, B, C, and D are listed in descending order of relevance. Reference Success Rate shows the predicted success rate of the next cluster scaling attempt/operation. Actual shows the result of next CLUSTER SCALING attempt that actually happened (Pass or Fail). Highest Failure Factor refers to which metric impacts the result the most. And the final column indicates failure=1 or success=0 in the database.

TABLE 2

| | A | B | C | D | Ref. Success Rate | Highest Failure Factor | Actual | Failure = 1 Success = 0 |
|---|---|---|---|---|---|---|---|---|
| Seed cluster | | | | | N/A | | Pass | 0 |
| Cluster A | | | X | | 65% | D | Pass | 0 |
| Cluster B | X | | | | 50% | A | Fail | 1 |
| Cluster C | X | X | | | 45% | A | Fail | 1 |
| Cluster D | | | | X | 90% | G | Pass | 0 |
| Cluster E | | X | | | 90% | F | Pass | 0 |
| Cluster F | | X | X | | 85% | F | Fail | 1 |
| ... | | | | | | | | |

As can be seen, the reference success rate for each cluster includes an example deduction based on which metrics include problems.

Quantitatively, assume that the cluster scaling result is y, and that x is one of the metric Enumeration results (A, B, C, D, . . . ), such that for each metric and cluster scaling result, we have a correlation coefficient formula as follows:

$$y_i = \beta x_i + \varepsilon$$

where i is the index of metric elements in the Enumeration, and $\beta$ and $\varepsilon$ are some constant values. Relativity (also referred to as relevance or criticality) may be defined as R, and y as the result of $x_i$ in {A, B, C, D, ... } as metric enumeration:

$$R^2 = 1 - \frac{\sum_{i=1}^{n} (y_i - \hat{y}_i)^2}{\sum_{i=1}^{n} (y_i - \bar{y})^2}$$

where $$\bar{y} = \frac{1}{n}\sum_{i=1}^{n} y_i$$

and n is the total number of pre-defined metrics.

Through this formula, the set of metrics that affect the final result most may be identified. Further, in a runtime environment, the formula may be used to improve the accuracy of predictions on a single scaling attempt for a given cluster. In this way, the knowledge base may provide dynamic information such that the clusters may learn from past experiences to guide the next action.

Although the formulas discussed above may provide one way of adjusting the relativity scores for each metric, other techniques may be used in other embodiments. As one of ordinary skill in the art with the benefit of this disclosure will appreciate, many existing statistical tools may also be employed in such an approach.

The knowledge base may also send relevant articles or other reference materials to the customer site along with the prediction result, so that the administrator can reference such materials and correct any issues that are leading to a prediction of failure. The operator may then try the prediction operation again (e.g., without performing the actual cluster scaling) to see if the prediction has improved. This may cause less impact to the business workload than attempting the cluster scaling itself and experiencing a failure.

The information in the database may provide a clear view of the relativity between the metrics and the actual results. After a large number of hundreds or thousands of attempts, the knowledge base may be able to determine with high accuracy which metrics affect the cluster scaling success rate most, and the next time when a customer site reaches out to the knowledge base for cluster scaling reference information, the knowledge base can offer even more accurate guidance.

Turning now to FIG. 2, a flow chart is shown of an example method 200 for predictively determining the success rate of cluster scaling events. At step 202, the cluster scaling engine (e.g., a software update agent) at a customer site may query the knowledge base to retrieve data regarding an upcoming cluster scaling event. For example, such data may include an indication of which metrics have been found to be most critical as to the success of the particular cluster scaling event.

At step 204, data may be collected regarding the local customer site environment. For example, data may be collected regarding the actual state of the cluster with respect to the various metrics discussed above, in order to determine whether or not such metrics might weigh against the successful completion of the cluster scaling event. Such data may be collected, in some embodiments, via one or more management controllers of the cluster. Based on the local data collection and the data retrieved from the knowledge base, an overall estimate may be determined for the likelihood of success.

At step 206, the user (e.g., administrator) at the customer site may be presented with the results of step 204. The user may then decide whether or not to proceed. The user may also receive information about the most relevant metrics, so that if some remedial action is needed to improve the success likelihood, then the most important remediations may be indicated. If the user decides not to proceed, the method may end. If the user decides to proceed, the method may proceed to step 208, in which the cluster scaling event is executed.

After the cluster scaling event has completed (whether in success or failure), data regarding the event may be sent back to the knowledge base at step 210. For example, the data may indicate the success or failure, as well as the various conditions at the cluster corresponding to the metrics.

At step 212, the knowledge base may incorporate the results from step 210 into its database. For example, as more and more data is accumulated, it may become apparent that a particular metric is more (or less) critical to the cluster scaling event than was previously estimated. Based on such a determination, the database may be adjusted to reflect that fact.

As one of ordinary skill in the art with the benefit of this disclosure will appreciate, many of the steps of method 200 may be performed at the customer site, at the knowledge base, or elsewhere in various embodiments.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Accordingly, embodiments of this disclosure may provide many advantages. For example, embodiments may offer guidance of how likely a single attempt of cluster scaling at a customer site is to succeed or fail. A customer may be provided a reference of the predicted success rate of this cluster scaling attempt, as well as guidance as to what system changes should be made when the predicted success rate is too low. This may improve customer satisfaction, reduce total cost of ownership, and reduce support costs.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to:
   receive a request from a particular remote information handling system cluster regarding a cluster scaling event;
   receive first information from a plurality of other remote information handling system clusters indicative of a success or a failure of a corresponding cluster expansion event that was performed at such other remote information handling system clusters;
   receive second information from the plurality of other remote information handling system clusters indicative of scores for such other remote information handling system clusters in a plurality of metrics;
   determine, based on the first and second information, a ranking of the metrics based on their criticality to the cluster scaling event;
   receive third information from the particular remote information handling system cluster indicative of scores for the particular remote information handling system cluster in the plurality of metrics;
   determine a likelihood of success for the cluster scaling event based on the determined ranking of the metrics and the scores for the particular remote information handling system cluster in the plurality of metrics; and
   in response to the likelihood of success for the cluster scaling event falling below a threshold likelihood, perform a remedial action prior to allowing the cluster scaling event to proceed, wherein the remedial action is selected from the group consisting of making a configuration change in the particular remote information handling system cluster, upgrading a component of the particular remote information handling system cluster, and downgrading a component of the particular remote information handling system cluster.

2. The information handling system of claim 1, wherein the remote information handling system clusters each comprise hyper-converged infrastructure (HCI) clusters.

3. The information handling system of claim 1, wherein the information handling system is further configured to transmit the likelihood of success for the cluster scaling event to a user of the particular remote information handling system cluster.

4. The information handling system of claim 1, wherein the information handling system is further configured to transmit at least one item of reference material to a user of the particular remote information handling system cluster regarding improving the likelihood of success for the cluster scaling event.

5. The information handling system of claim 4, wherein the at least one item of reference material is transmitted in response to the likelihood of success for the cluster scaling event falling below the threshold likelihood.

6. The information handling system of claim 4, wherein the at least one item of reference material is transmitted in response to the user opting not to proceed with the cluster scaling event.

7. The information handling system of claim 1, wherein the information handling system is further configured to:
   receive information from the particular remote information handling system cluster indicative of a success or a failure of the cluster scaling event; and
   update the ranking of the metrics based on the received information.

8. A computer-implemented method comprising:
   receiving a request from a particular remote information handling system cluster regarding a cluster scaling event;
   receiving first information from a plurality of other remote information handling system clusters indicative of a success or a failure of a corresponding cluster scaling event that was performed at such other remote information handling system clusters;
   receiving second information from the plurality of other remote information handling system clusters indicative of scores for such other remote information handling system clusters in a plurality of metrics;
   determining, based on the first and second information, a ranking of the metrics based on their criticality to the cluster scaling event;
   receiving third information from the particular remote information handling system cluster indicative of scores for the particular remote information handling system cluster in the plurality of metrics;
   determining a likelihood of success for the cluster scaling event based on the determined ranking of the metrics and the scores for the particular remote information handling system cluster in the plurality of metrics; and
   in response to the likelihood of success for the cluster scaling event falling below a threshold likelihood, performing a remedial action prior to allowing the cluster scaling event to proceed, wherein the remedial action is selected from the group consisting of making a configuration change in the particular remote information handling system cluster, upgrading a component of the particular remote information handling system cluster, and downgrading a component of the particular remote information handling system cluster.

9. The method of claim 8, wherein the cluster scaling event comprises a cluster expansion event.

10. The method of claim 8, further comprising transmitting the likelihood of success for the cluster scaling event to a user of the particular remote information handling system cluster.

11. The method of claim 8, further comprising transmitting at least one item of reference material to a user of the particular remote information handling system cluster regarding improving the likelihood of success for the cluster scaling event.

12. The method of claim 8, further comprising:
receiving information from the particular remote information handling system cluster indicative of a success or a failure of the cluster scaling event; and
updating the ranking of the metrics based on the received information.

13. The method of claim 8, wherein the plurality of metrics includes a system version metric, a hardware model metric, a system health metric, and a workload metric.

14. An article of manufacture comprising a non-transitory, computer-readable medium having computer-executable code thereon that is executable by a processor of an information handling system for:
receiving a request from a particular remote information handling system cluster regarding a cluster scaling event;
receiving first information from a plurality of other remote information handling system clusters indicative of a success or a failure of a corresponding cluster scaling event that was performed at such other remote information handling system clusters;
receiving second information from the plurality of other remote information handling system clusters indicative of scores for such other remote information handling system clusters in a plurality of metrics;
determining, based on the first and second information, a ranking of the metrics based on their criticality to the cluster scaling event;
receiving third information from the particular remote information handling system cluster indicative of scores for the particular remote information handling system cluster in the plurality of metrics;
determining a likelihood of success for the cluster scaling event based on the determined ranking of the metrics and the scores for the particular remote information handling system cluster in the plurality of metrics; and
in response to the likelihood of success for the cluster scaling event falling below a threshold likelihood, performing a remedial action prior to allowing the cluster scaling event to proceed, wherein the remedial action is selected from the group consisting of making a configuration change in the particular remote information handling system cluster, upgrading a component of the particular remote information handling system cluster, and downgrading a component of the particular remote information handling system cluster.

15. The article of claim 14, wherein the remote information handling system clusters each comprise hyper-converged infrastructure (HCI) clusters.

16. The article of claim 14, wherein the code is further executable for:
transmitting the likelihood of success for the cluster scaling event to a user of the particular remote information handling system cluster.

17. The article of claim 14, wherein the code is further executable for:
transmitting at least one item of reference material to a user of the particular remote information handling system cluster regarding improving the likelihood of success for the cluster scaling event.

18. The article of claim 17, wherein the at least one item of reference material is transmitted in response to the likelihood of success for the cluster scaling event falling below the threshold likelihood.

19. The article of claim 17, wherein the at least one item of reference material is transmitted in response to the user opting not to proceed with the cluster scaling event.

20. The article of claim 14, wherein the code is further executable for:
receiving information from the particular remote information handling system cluster indicative of a success or a failure of the cluster scaling event; and
updating the ranking of the metrics based on the received information.

* * * * *